United States Patent
Nozaki

(10) Patent No.: US 6,937,549 B2
(45) Date of Patent: Aug. 30, 2005

(54) RECORDING/REPRODUCING APPARATUS

(75) Inventor: Kenichi Nozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 10/297,869

(22) PCT Filed: Apr. 11, 2002

(86) PCT No.: PCT/JP02/03607
§ 371 (c)(1),
(2), (4) Date: Dec. 10, 2002

(87) PCT Pub. No.: WO02/084666
PCT Pub. Date: Oct. 24, 2002

(65) Prior Publication Data
US 2003/0169661 A1 Sep. 11, 2003

(30) Foreign Application Priority Data
Apr. 12, 2001 (JP) ........................................ 2001-113915

(51) Int. Cl.[7] ................................................. G11B 7/00
(52) U.S. Cl. ................... 369/53.1; 369/53.2; 369/47.32
(58) Field of Search .............................. 369/53.1, 53.2, 369/47.32, 47.22, 47.27, 53.11, 53.21, 53.45, 47.1, 47.31

(56) References Cited

U.S. PATENT DOCUMENTS

RE35,839 E * 7/1998 Asai et al. ...................... 713/2

FOREIGN PATENT DOCUMENTS

| JP | 63-90088 | 4/1988 |
|---|---|---|
| JP | 1-169793 | 7/1989 |
| JP | 9-204759 | 8/1997 |
| JP | 9-320245 | 12/1997 |
| JP | 10-64178 | 3/1998 |
| JP | 2000-132947 | 5/2000 |
| JP | 2001-67849 | 3/2001 |

OTHER PUBLICATIONS

Patent Abstract—Japanese Publication No. JP63–013188 dated Jan. 20, 1988.
Patent Abstract—Japanese Publication No. JP64–49189 dated Feb. 23, 1989.

* cited by examiner

Primary Examiner—Nabil Hindi
(74) Attorney, Agent, or Firm—Frommer Lawrence & Haug LLP; William S. Frommer

(57) ABSTRACT

When an audio signal and music piece name information are recorded onto a CD-R, timing for inputting the music piece name information is not restricted to timing just before "finalize". An ID is allocated to the CD-R inserted into a recorder and written into a PMA and a memory. The audio signal is recorded into a PGA on the CD-R. The music piece name information and the like are inputted by text data and stored into the memory in correspondence to the ID. Upon "finalize", the text data is read out from the memory and written as TOC information into a lead-in on the CD-R. In case of ejecting the CD-R without finalizing, a track number, start time, and end time are recorded into the PMA. The ID and the text data are held in the memory. When this CD-R is subsequently inserted, they can be read out from the memory on the basis of the ID. Before "finalize", the text data which is recorded as TOC information can be inputted anytime.

2 Claims, 7 Drawing Sheets

Fig. 3

| S0.S1 | CONTR | ADR | TNO | POINT | MIN | SEC | FRAME | ZERO | PMIN | PSEC | PFRAME | CRC |

Fig. 4

| FRAME NO. | CONTROL &ADR | TNO | POINT | MIN | SEC | PRM | ZERO | PMIN | PSEC | PFRM |
|---|---|---|---|---|---|---|---|---|---|---|
| 1 | 02 | 00 | 00 | 00 | 00 | 12 | 00 | 00 | 00 | 00 |
| 2 | 02 | 00 | 00 | 00 | 00 | 12 | 01 | 00 | 00 | 00 |
| 3 | 02 | 00 | 00 | 00 | 00 | 12 | 02 | 00 | 00 | 00 |
| 4 | 02 | 00 | 00 | 00 | 00 | 12 | 03 | 00 | 00 | 00 |
| 5 | 02 | 00 | 00 | 00 | 00 | 12 | 04 | 00 | 00 | 00 |
| 6 | 02 | 00 | 00 | 00 | 00 | 12 | 05 | 00 | 00 | 00 |
| 7 | 02 | 00 | 00 | 00 | 00 | 12 | 06 | 00 | 00 | 00 |
| 8 | 02 | 00 | 00 | 00 | 00 | 12 | 07 | 00 | 00 | 00 |
| 9 | 02 | 00 | 00 | 00 | 00 | 12 | 08 | 00 | 00 | 00 |
| 10 | 02 | 00 | 00 | 00 | 00 | 12 | 09 | 00 | 00 | 00 |
| 11 | 01 | 00 | 01 | 05 | 45 | 67 | 00 | 00 | 02 | 01 |
| 12 | 01 | 00 | 01 | 05 | 45 | 67 | 01 | 00 | 02 | 01 |
| 13 | 01 | 00 | 01 | 05 | 45 | 67 | 02 | 00 | 02 | 01 |
| 14 | 01 | 00 | 01 | 05 | 45 | 67 | 03 | 00 | 02 | 01 |
| 15 | 01 | 00 | 01 | 05 | 01 | 67 | 04 | 00 | 02 | 01 |
| 16 | 01 | 00 | 02 | 12 | 01 | 09 | 05 | 05 | 45 | 67 |
| 17 | 01 | 00 | 02 | 12 | 01 | 09 | 06 | 05 | 45 | 67 |
| 18 | 01 | 00 | 02 | 12 | 01 | 09 | 07 | 05 | 45 | 67 |
| 19 | 01 | 00 | 02 | 12 | 01 | 09 | 08 | 05 | 45 | 67 |
| 20 | 01 | 00 | 02 | 12 | 01 | 09 | 09 | 05 | 45 | 67 |
| 21 | 01 | 00 | 03 | 30 | 17 | 42 | 00 | 12 | 04 | 09 |
| 22 | 01 | 00 | 03 | 30 | 17 | 42 | 01 | 12 | 04 | 09 |
| 23 | 01 | 00 | 03 | 30 | 17 | 42 | 02 | 12 | 04 | 09 |
| 24 | 01 | 00 | 03 | 30 | 17 | 42 | 03 | 12 | 04 | 09 |
| 25 | 01 | 00 | 03 | 30 | 17 | 42 | 04 | 12 | 04 | 09 |
| 26 | 01 | 00 | 04 | 37 | 50 | 18 | 05 | 30 | 19 | 52 |
| 27 | 01 | 00 | 04 | 37 | 50 | 18 | 06 | 30 | 19 | 52 |
| 28 | 01 | 00 | 04 | 37 | 50 | 18 | 07 | 30 | 19 | 52 |
| 29 | 01 | 00 | 04 | 37 | 50 | 18 | 08 | 30 | 19 | 52 |
| 30 | 01 | 00 | 04 | 37 | 50 | 18 | 09 | 30 | 19 | 52 |
| 31 | ···NON RECORDING | | | | | | | | | |

RECORDING/REPRODUCING APPARATUS

TECHNICAL FIELD

The invention relates to a recording and reproducing apparatus for recording audio data onto a CD-R (Compact Disc-Recordable) in accordance with CD-DA (CD-Digital Audio) and names of recording music pieces in a format of CD-TEXT.

BACKGROUND ART

In recent years, a CD-R (Compact Disc-Recordable) which has compatibility on characteristics with a conventional CD (Compact Disc) and can record data has remarkably been spread. In the CD-R, for example, a pigment layer is formed on a reflecting surface, pigment is altered by laser irradiation, and pits are formed, thereby recording data.

A recording medium called CD-RW (CD-Rewritable) which is made to be rewritable by overwriting of data by using a phase change recording system is also being spread. An example of the CD-R will be mainly explained hereinbelow.

A layout of data which is common in the CD and the CD-R will be schematically explained with respect to the example of the CD. The CD is accessed from the inner rim side and a data area is arranged in order of a lead-in, data, and a lead-out from the inner rim side. A unit of a data portion is called "one track". For example, in the CD-DA (CD-Digital Audio) in which audio data has been recorded, each music piece corresponds to one track. A session is formed by a combination of the lead-in, data, and lead-out.

A TOC (Table Of Contents) in which information showing contents of the CD is stored is recorded in the lead-in area. The TOC information which is recorded in the TOC comprises the number of music pieces recorded in the CD, start position information of the track, and the like, for example, in case of the CD-DA.

As a structure peculiar to the CD-R, in addition to the existence of the pigment layer mentioned above, two areas of a PCA (Power Calibration Area) and a PMA (Program Memory Area) are provided on the further inner side than an area where data has been recorded in a general unrecordable CD. The PCA is an area where a test writing is executed in order to adjust an intensity of a laser beam at the time of writing data into the CD-R. The PMA is an area where when data is written by "Track At Once", which will be explained hereinlater, or the like, address information of a head and an end of the written track is written.

A pregroove as a groove for guiding is provided for the CD-R. The pregroove is slightly wobbled and used as an address upon recording. It is called ATIP (Absolute Time In Pregroove).

As a recording method in case of writing audio data into the CD-R, there are two methods such as Disk At Once whereby one session comprising the lead-in, data, and lead-out is written onto one disc in a lump and Track At Once whereby the data is written onto the disc one track by one. According to Track At Once, since the lead-out and lead-in are written after the data, data can be written until the lead-out and lead-in are written and the session is closed.

The writing in Track At Once is schematically performed as follows. When the writing of the data of the first track is finished, obtained recording start time and end time are written into the PMA together with a track number TNO on the basis of ATIP information. Also when the second track is written subsequently to the first track, the recording start time and end time are written into the PMA together with the track number TNO. After completion of the writing of all tracks as mentioned above, the TOC information is subsequently formed on the basis of the information written in the PMA and the lead-in is written. In Track At Once, processes for writing the lead-out, forming the TOC information on the basis of the information in the PMA, and writing the lead-in are called "finalize".

An audio CD recorder which can easily write audio data into such a CD-R is being spread. In the audio CD recorder, music piece name information can be recorded together with the audio data in accordance with the CD-TEXT format. At this time, the music piece name information is recorded into the TOC area. In the audio CD recorder, generally, the audio data is recorded into the CD-R every track by Track At Once mentioned above. When all audio data to be recorded is recorded into the CD-R, "finalize" is executed and the TOC information is written into the lead-in area.

Therefore, hitherto, to record the music piece name information into the CD-R, the music piece name information has to be inputted just before the finalizing process. That is, conventionally, there is a problem such that the timing when the music piece name information can be inputted is limited.

There is considered a case where in a state where the recording has been finished to a certain track, the CD-R in which "finalize" is not performed yet is taken out of the audio CD recorder, the removed CD-R is again loaded into the audio CD recorder, and audio data is written. Hitherto, in such a case, the music piece names recorded in the CD-R before the writing operation, that is, before the CD-R is taken out of the audio CD recorder are not known. There is, consequently, a problem such that the user must store the recorded music piece names.

As mentioned above, the audio CD recorder in which the audio data and the music piece name information are recorded into the CD-R according to the conventional technique, there are problems such that use efficiency for the user is low and there is also a fear that an erroneous operation is caused.

It is, therefore, an object of the invention to provide a recording and reproducing apparatus such that when audio data and music piece name information are recorded into a CD-R, timing for inputting the music piece name information is not restricted to the timing just before "finalize".

Another object of the invention to provide a recording and reproducing apparatus such that text information of a disc before "finalize" can be stored and, when the disc corresponding to the text information is subsequently loaded, the text information can be read out.

DISCLOSURE OF INVENTION

To solve the problems mentioned above, according to the invention, there is provided a recording and reproducing apparatus for recording and reproducing data onto/from a recording medium having a recording area where a program can be recorded and a management area where management information for managing the program recorded in the recording area is recorded, comprising: recording means for recording an identifier that is peculiar to the recording medium into the management area and the program into the recording area upon recording; memory means for holding the identifier peculiar to the recording medium and information regarding the program which is recorded into the recording area in correspondence to each other; reproducing means for reproducing an identifier of the management area on the recording medium inserted after the recording medium was once ejected before the management information in the management area is updated; comparing means for comparing the identifier reproduced by the reproducing means with the identifier held in the memory means; and control means for controlling the recording means so that the information regarding the program which is recorded into the memory means in correspondence to the identifier peculiar to the recording medium is recorded as management information when it is decided by the comparing means that the identifier reproduced by the reproducing means and the identifier held in the memory means coincide.

As mentioned above, according to the invention, when recording, the identifier peculiar to the recording medium is recorded into the management area. The identifier peculiar to the recording medium and the information regarding the program which is recorded into the recording medium are held in the memory in correspondence to each other. Before the management information in the management area is updated, the identifier of the management area on the recording medium inserted after the recording medium was once ejected is reproduced. The reproduced identifier and the identifier held in the memory are compared. When the reproduced identifier and the identifier held in the memory coincide, the information regarding the program which is recorded into the memory in correspondence to the identifier peculiar to the recording medium is recorded as management information onto the recording medium. Therefore, the information regarding the program can be inputted anytime before the management information is updated.

BRIEF DESCRIPTION OF DRAWINGS

FIG. 3 is a schematic diagram showing a construction of a subcode Q channel of a PMA;

FIG. 4 is a schematic diagram showing data of an example of the subcode Q channel in a CD-R whose disc ID is equal to 12;

BEST MODE FOR CARRYING OUT THE INVENTION

An embodiment of the invention will be described hereinbelow. First, for easy understanding, a physical format in a recordable CD will be explained. An explanation will be made hereinbelow on the assumption that the recordable CD is a CD-R (Compact Disc-Recordable).

In the CD-R, a guide groove called a groove has previously been formed so that the operation such as tracking or the like can be executed even in a non-recording state (blank disc). Time information called ATIP is recorded on the groove by an FM modulation and biphase encoding. The groove is slightly wobbled. Each area is specified on the surface of the CD-R disc on the basis of the ATIP.

Information such as maximum recordable time, recording power which is recommended for the disc, disc application code, and the like is preliminarily recorded in the ATIP.

Figure 1:
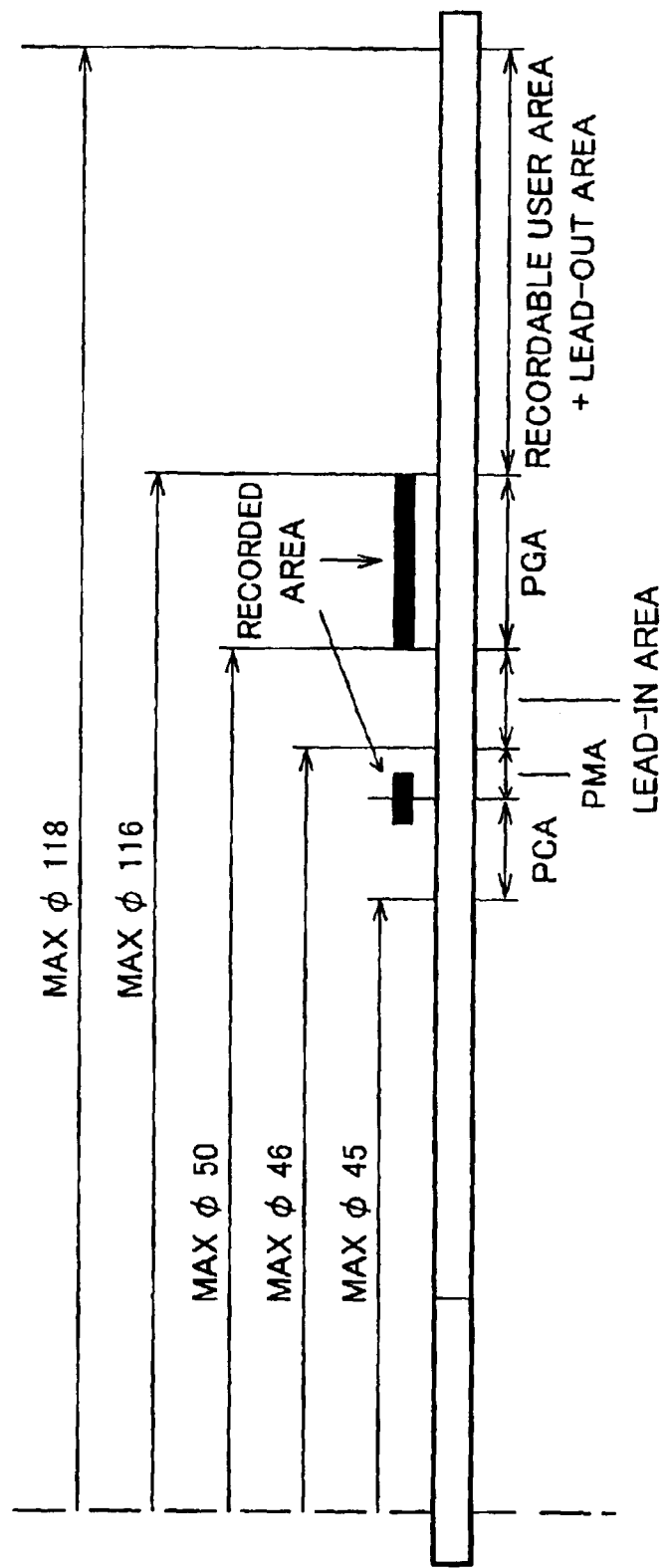
FIG. 1 is a schematic diagram showing a layout of each area in a CD-R from a direction of a cross section.

FIG. 1 shows a layout of each area in the CD-R specified as mentioned above from a direction of a cross section. The layout corresponding to the radius is shown in FIG. 1. As shown in the diagram, in the CD-R having a diameter of about $\phi120$, the PCA and PMA mentioned in the prior art are arranged in a range from (maximum) $\phi45$ to (maximum) $\phi46$. A region from (maximum) $\phi46$ to (maximum) $\phi50$ is set to a lead-in area. A region from (maximum) $\phi50$ to (maximum) $\phi116$ is set to a recording area where data can be recorded. This recording area is called PGA (Program Area). The maximum value of an outer edge of a lead-out area is set to $\phi118$.

In FIG. 1, an area where the data has already been recorded is shown by a black belt as an example. In this example, it will be understood that the data has already been recorded in parts of the PCA and PMA areas and a part of the data recording area.

Subsequently, a procedure for recording the data into the CD-R will be schematically explained. As a recording method at the time when audio data is written into the CD-R, there are Disk At Once and Track At Once as mentioned above. According to Disk At Once, one session comprising the lead-in, data, and lead-out is written at once onto one disc. According to Disk At Once, the writing operation is executed in order of lead-in, data, and lead-out in the direction from the inner rim side toward the outer rim side of the disc. According to this method, when the data is written, it is necessary that all information such as the number of all tracks which are recorded, start time and end time of each track, and the like, that is, all information to be recorded as TOC information has been fully prepared.

On the other hand, Track At Once is a method of writing data onto the disc every track. According to Track At Once, the writing operation is executed in order of data, lead-out, and lead-in. According to this method, since the lead-out and lead-in are written after the data, the data can be written until the lead-out and lead-in are written and the session is closed.

A writing sequence in Track At Once will be schematically described. It is considered a case where after the data (audio data) of the first track was written, audio data of the second track is written without closing the session.

First, before the recording of the audio data is started, in order to perform the proper recording, a test recording is executed while changing a laser power for the PCA and the laser power is adjusted so as to obtain the optimum laser power. After that, the audio data is recorded into the PGA. The audio data of the first track is written into the PGA. At this time, the recording start time and end time are read out from the ATIP. The read values are written into the PMA at the end of the writing. Subsequently, the data of the second track is written after the first track. After completion of the writing of the second track, the recording start time and end time of the second track read out from the ATIP are written into the PMA.

A predetermined linking rule and a pregap or the like as necessary are placed between the first and second tracks.

As mentioned above, the finalizing process is executed after completion of the writing of all of the tracks. That is, the lead-out is written from the outer edge of the PGA and the TOC information is formed on the basis of the information written in the PMA and written into the lead-in area locating on the inner rim of the PGA. In this manner, the recording of the audio CD disc according to the Red Book by the CD-R is completed.

Figure 2:
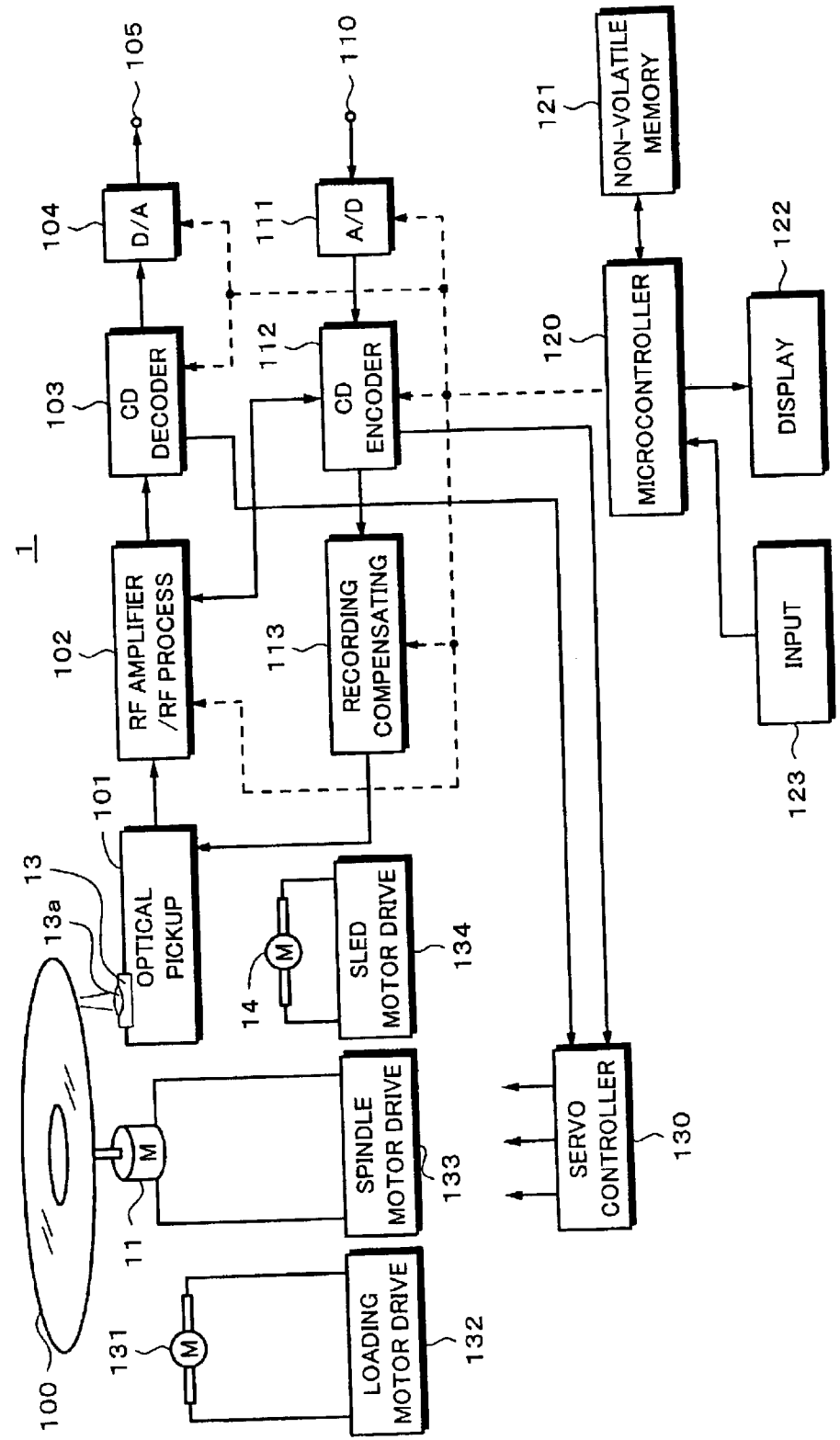
FIG. 2 is a block diagram showing a construction of an example of an audio CD recorder 1 which can be applied to the invention.

FIG. 2 shows a construction of an example of an audio CD recorder 1 which can be applied to the invention. The audio CD recorder 1 can convert an analog audio signal supplied from the outside into a digital audio signal and record it into the CD-R in a format according to the CD-DA format.

In the recording system, the analog audio signal supplied from the outside is inputted to a terminal 110. The analog audio signal is supplied to an A/D converter 111 from the terminal 110 and converted into the digital audio signal and supplied to a CD encoder 112. Subcode data is supplied from a microcontroller 120, which will be explained hereinlater, to the CD encoder 112. In the CD encoder 112, the digital audio signal is subjected to processes such as error correction encoding, EFM (Eight to Fourteen Moduration), and the like together with the subcode data and encoded into a signal suitable for executing the recording according to the CD-DA format to the CD-R 100. An output of the CD encoder 112 is supplied to a recording compensating unit 113.

In the CD encoder 112, ATIP information is decoded from a reproduction signal which is supplied from an RF amplifier/RF processing unit 102, which will be explained hereinlater, and a sync signal is extracted from the reproduction signal. The ATIP information and sync signal are supplied to a servo controller 130.

In the recording compensating unit 113, in order to stably record pits which are formed by the EFM, a predetermined pulse shaping process is executed to an output of the CD encoder 112. A recording signal outputted from the recording compensating unit 113 is supplied to an optical pickup unit 101. The optical pickup unit 101 comprises: an objective lens 13a; and an optical block 13 having a laser beam source (not shown) and a photosensing unit (not shown) for detecting the laser beam reflected by a CD-R 100. Although not shown, the optical pickup unit 101 further comprises: a laser driver for modulating the supplied signal and driving the laser beam source; and a converting unit for converting the laser beam detected by the photosensing unit into an electric signal.

Upon recording, a laser power of the laser beam source is controlled to an intensity suitable for recording. The laser beam source is modulated on the basis of the recording signal supplied from the recording compensating unit 113, and the modulated laser beam is irradiated onto a recording layer of the CD-R 100. In the CD-R 100, predetermined pits are formed by the irradiated laser beam, thereby performing the recording of the recording signal. Upon reproduction, the laser power of the laser beam source is controlled to an intensity suitable for reproduction and the laser beam is irradiated onto the CD-R 100. The laser beam is reflected by the CD-R 100, detected by the photosensing unit, and converted into the electric signal.

In a reproducing system, the laser beam detected by the photosensing unit is converted into the electric signal and the resultant reproduction signal is outputted from the optical pickup unit 101 and supplied to the RF amplifier/RF processing unit 102. The reproduction signal is subjected to a predetermined signal process such as a waveform shaping process by the RF amplifier/RF processing unit 102.

The reproduction signal outputted from the RF amplifier/RF processing unit 102 is supplied to a CD decoder 103. The reproduction signal is demodulated by the CD decoder 103 and becomes a digital signal and, further, an error correction code is decoded and an error correction is made. The error-corrected digital audio signal is supplied to a D/A converter 104, converted into an analog audio signal, and outputted to a terminal 105.

In the CD decoder 103, the subcode data from the reproduction signal is also extracted. The extracted subcode data is supplied to, for example, the microcontroller 120.

On the other hand, a loading motor 131 is driven by a loading motor drive 132 and the loading and unloading of the CD-R 100 are controlled. A spindle motor 11 is driven by a spindle motor drive 133 and the rotation of the CD-R 100 is controlled. A sled motor 14 is driven by a sled motor drive 134. A position control of the optical pickup unit 101 is performed. A feed control of the optical pickup unit 101 and a focusing/tracking control of the optical pickup unit 101 are performed.

The loading motor drive 132, spindle motor drive 133, and sled motor drive 134 are controlled by the servo controller 130. For example, upon recording, the sled motor drive 134 is controlled on the basis of the ATIP information supplied from the CD encoder 112, and an address control is performed. The spindle motor drive 133 is controlled by the servo controller 130 on the basis of the sync signal supplied from the CD encoder 112 and the rotation of the spindle motor 11 is controlled. Although not shown, the servo controller 130 is controlled also by a command from the microcontroller 120.

The microcontroller 120 comprises, for example, a microprocessor and controls each section of the audio CD recorder 1. A non-volatile memory 121, a display unit 122, and an input unit 123 are connected to the microcontroller 120.

The input unit 123 has an operation unit such as various keys, dials, and the like and outputs a control signal according to the operation which is executed to the operation unit by the user. The control signal outputted from the input unit 123 is supplied to the microcontroller 120, so that various commands and data are generated. The data supplied from the microcontroller 120 is stored in the non-volatile memory 121. The stored data is read out by an instruction of the microcontroller 120 and supplied to the microcontroller 120.

A display control signal is formed by the microcontroller 120 on the basis of a state of the audio CD recorder 1, the control signal from the input unit 123, and the like. The display control signal is supplied to the display unit 122 comprising, for example, an LCD (Liquid Crystal Display) and a predetermined display is performed.

In the above construction, a process for recording an audio signal into the non-recording CD-R 100 will be schematically explained. First, by the control of the loading motor 131 by the loading motor drive 132, the CD-R 100 is moved to a predetermined position and loaded into the apparatus. For example, on the basis of the operation of the input unit 123 by the user, a recording command to instruct the recording is generated from the microcontroller 120.

By the recording command, various servo controls are established by the servo controller 130. The optical pickup unit 101 is moved to the PCA of the CD-R 100 by the sled motor 14 driven by the sled motor drive 134, and the calibrating operation is executed. The calibration is performed by a laser power close to a recommended recording power of the CD-R 100 on the basis of the ATIP information which has previously been read out from the CD-R 100.

The analog audio signal is supplied from the terminal 110, converted into the digital audio signal by the A/D converter 111, and supplied to the CD encoder 112. The digital audio signal is error correction encoded, EFM modulated, and outputted by the CD encoder 112, subjected to a waveform shaping process or the like by the recording compensating unit 113, and supplied to the optical pickup unit 101. In the optical pickup unit 101, the laser beam is modulated on the basis of the supplied signal. The modulated laser beam is properly irradiated to the CD-R 100 via the objective lens 13a, so that the audio data is recorded onto the CD-R 100.

Upon recording, a sampling pulse of an RF signal is supplied from the CD encoder 112 to the RF amplifier/RF processing unit 102. In the RF amplifier/RF processing unit 102, on the basis of the supplied sampling pulse, the reproduction signal in which the pits were reproduced just after the recording is monitored in the optical pickup unit 101. On the basis of a monitoring result, a fine adjustment of the continuous recording laser power is made by using the well-known method called Running OPC (Running Optimum Power Control).

After completion of the recording of all of the audio data to be recorded, the finalizing process is executed and the CD-R 100 is ejected from the audio CD recorder 1. At this time, as necessary, text data regarding the recorded audio data is inputted as CD-TEXT information from the input unit 123. The text data is supplied to the CD encoder 112, stored into the TOC information, subjected to the predetermined processes as mentioned above in the CD encoder 112 and recording compensating unit 113, supplied to the optical pickup unit 101, and written into the lead-in area in the CD-R 100.

According to the invention, a disc ID as a unique identification number is formed every CD-R 100 for the non-recording CD-R 100 loaded into the audio CD recorder 1. The formed disc ID is written into the PMA of the CD-R 100 and stored into the non-volatile memory 121. When the text data (CD-TEXT information) to be recorded into the TOC area is inputted from the input unit 123, the text data is stored into the non-volatile memory 121 in correspondence to the disc ID indicative of the CD-R 100.

The text data stored in the non-volatile memory 121 is read out from the non-volatile memory 121 and written into the TOC area of the CD-R 100 when the CD-R 100 of the corresponding disc ID is finalized.

By using the above construction, the timing for inputting the text data is not limited to the timing for "finalize". Even for the CD-R 100 which has been unloaded without being finalized, when this CD-R 100 is loaded again, by reading out the disc ID written in the PMA and reading out the text data corresponding to the read-out disc ID from the non-volatile memory 121, the text data can be written into the TOC area when this CD-R 100 is finalized. Further, even after the CD-R 100 was unloaded, by designating a desired disc ID, the corresponding text data can be read out from the non-volatile memory 121 and displayed by, for example, the display unit 122.

As mentioned above, in the case where the recording has partially been performed like Track At Once or the like, the time information is tentatively held by the PMA. Upon finalizing, the TOC information is formed on the basis of the time information held in the PMA. That is, a temporary TOC is recorded into the PMA. The recording of the temporary TOC into the PMA is performed by encoding the information into a subcode Q channel of the PMA. Upon recording in Track At Once, the writing of up to 100 times is permitted and, in this instance, it is obligated to record the temporary TOC into the PMA.

According to the embodiment, the disc ID is written into the subcode Q channel of the PMA. FIG. 3 shows a construction of the subcode Q channel of the PMA. In the subcode Q channel of the PMA, in addition to the track number TNO, the start time, and the end time of the relevant track, and a parity bit for data check, a value called ADR showing which kind of information has been stored as Item is stored.

As information which can be recorded as Item into the subcode Q channel of the PMA, there are the following six items classified by the ADR.

ADR=1: TOC Item
ADR=2: Disc Identification Item
ADR=3: Skip Track Item
ADR=4: Unskip Item
ADR=5: Skip Time Interval Item
ADR=6: Unskip Time Interval Item Among them, ADR=1 is the temporary TOC information mentioned above and indispensable. ADR=2 to ADR=6 are options. Further, ADR=4 and ADR=6 are Reserved in the CD-RW. Each Item shown at ADR=1 to ADR=6 can be recorded the number of times which is permitted by a recording capacity of the PMA.

In the embodiment, among the six items of the foregoing ADRs, the information "Disc Identification" of ADR=2 is used. When ADR=2, the disc ID which specifies each CD-R 100 can be written as a decimal numeral of six digits into MIN, SEC, and FRAME shown in FIG. 3.

FIG. 4 shows the data of an example of the subcode Q channel in the CD-R in which the disc ID is set to 12. The disc ID "12 (00 00 12)" has been written into the row of ADR=2 (02) by using MIN, SEC, and FRAME.

The disc ID is a number which can identify each CD-R 100 in the audio CD recorder 1. For example, a code which is unique to each CD-R 100 can be allocated thereto as a disc ID by six digits. A predetermined index code and a special code can be also combined and used. Further, it is also possible to construct in a manner such that a number which is peculiar to the audio CD recorder 1 has been preset every apparatus and is combined with another code, and such a combination is used as a disc ID.

Although a method of using serial numbers as disc IDs can be also considered, in this case, when the relevant CD-R 100 is used for a CD-R recorder of another type to which the invention is not applied, since there is a possibility of the occurrence of a problem, it is unpreferable.

In the example of FIG. 4, the disc ID is written into Frame Numbers 1 to 10. As mentioned above, in case of this example, the disc ID is repetitively written ten times. Further, in Frame Numbers 11 to 30, ADR=1 and the start time and end time of the tracks 1 to 4 have been recorded, respectively.

Figure 5:
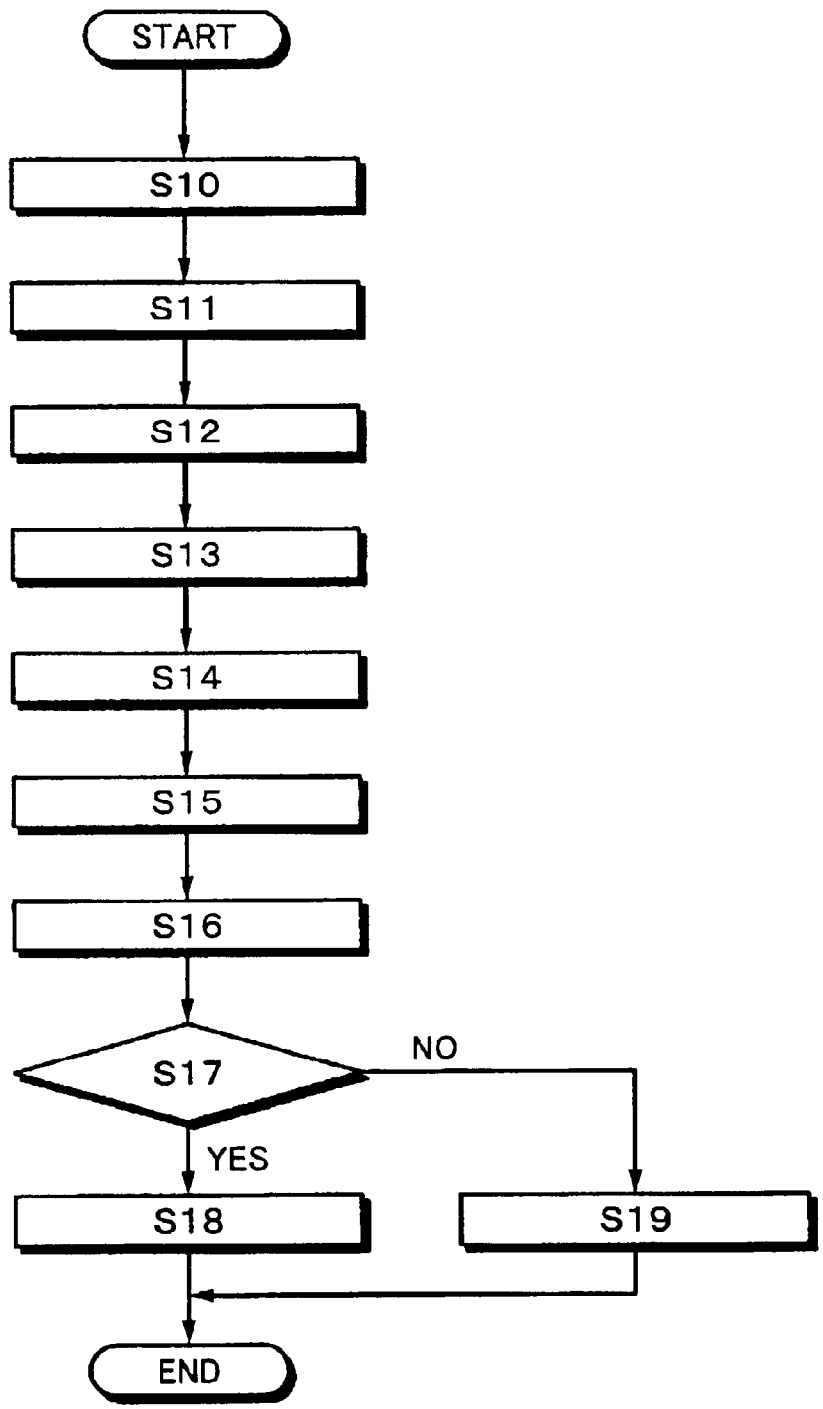
FIG. 5 is a flowchart showing processes of an example according to an embodiment.

FIG. 5 is a flowchart showing processes of an example according to the embodiment. This flowchart relates to an example in a case where the CD-R 100 is not unloaded from the audio CD recorder 1. First, in first step S10, the non-recording CD-R 100 is properly loaded into the audio CD recorder 1 (loading-in). In step S11, a laser power for writing is calibrated by using the PCA of the loaded CD-R 100.

In next step S12, the disc ID of ADR=2 is recorded into the PMA. For example, in the microcontroller 120, the disc ID is automatically formed as a numerical value of six digits. The formed disc ID is supplied to the CD encoder 112, encoded into the subcode Q channel of the PMA at ADR=2, supplied to the optical pickup unit 101 via the recording compensating unit 113, and recorded into the PMA of the CD-R 100. In addition to it, the disc ID formed by the microcontroller 120 is also stored into the non-volatile memory 121 in step S13.

In next step S14, the audio data is recorded into the PGA. That is, the analog audio signal supplied from the terminal 110 is converted into the digital audio signal by the A/D converter 111 and supplied to the CD encoder 112. The digital audio signal is error correction encoded and EFM modulated by the CD encoder 112, outputted, subjected to the waveform shaping process or the like by the recording compensating unit 113, and supplied to the optical pickup unit 101. In the optical pickup unit 101, the laser beam modulated on the basis of the supplied recording signal is irradiated onto the CD-R 100, so that the audio data is recorded onto the CD-R 100.

In step S15, the CD-TEXT information is inputted by the user. For example, information such as names of the music pieces and the like regarding the audio signal inputted at present from the terminal 110 is inputted as text data by the input unit 123. In next step S16, the inputted text data is stored into the non-volatile memory 121 in correspondence to the disc ID allocated to the CD-R 100 loaded at present in the audio CD recorder 1.

It is also possible that the input of the text data in step S15 mentioned above is executed every track number TNO and the track number TNO and the text data are stored into the non-volatile memory 121 in correspondence to each other. An album title or the like can be also stored into the non-volatile memory 121 in correspondence to the disc ID.

After completion of the recording of the audio signal to the CD-R 100, whether the finalizing process is executed or not is discriminated in step S17. For example, if the execution of the finalizing process is instructed by the input to the input unit 123 by the user, the processing routine advances to step S18.

In step S18, the text data stored in the nonvolatile memory 121 is read out and written as TOC information into the lead-in area of the CD-R 100. That is, the text data stored in the non-volatile memory 121 is read out, supplied to the CD encoder 112, and encoded to a subcode. The signal is subjected to the predetermined signal processes as mentioned above in the CD encoder 112 and recording compensating unit 113, supplied to the optical pickup unit 101, and written as TOC information into the lead-in area of the CD-R 100.

At this time, as necessary, the text data written as TOC information in the CD-R 100 is erased from the non-volatile memory 121. This process is not limited to such an example. It is also possible that the text data is held in the non-volatile memory 121 for a period of time of a certain extent and, thereafter, erased. The text data stored in the non-volatile memory 121 can be also erased on the basis of an instruction of the user.

If the non-execution of the finalizing process is instructed in step S17, the processing routine advances to step S19. In step S19, the track number TNO of the track recorded on the CD-R 100 and the information of the start time and end time of the track are written into the PMA and the temporary TOC is recorded.

For example, if the unloading of the CD-R 100 is instructed by, for instance, the input to the input unit 123 by the user, the loading motor 131 is driven by the loading motor drive 132, so that the CD-R 100 is unloaded and ejected.

In the flowchart of FIG. 5, the processes in steps S15 and S16 can be executed before the process in step S14 is finished. The order of the process in step S14 and the order of the processes in steps S15 and S16 can be also made to be different from those shown in FIG. 5. That is, the audio data can be also recorded after the text data was inputted. Further, information other than the audio data which is at present being recorded can be also inputted. For instance, all text information regarding the audio data which will be recorded onto the CD-R 100 can be also preliminarily inputted.

As for the input unit 123 and the display by the display unit 122, for example, if the display by the display unit 122 is constructed by using a proper GUI (Graphical User Interface) or the like so as to enable such an input to be easily executed, it is preferable because an operability of the user is improved.

Figure 6:
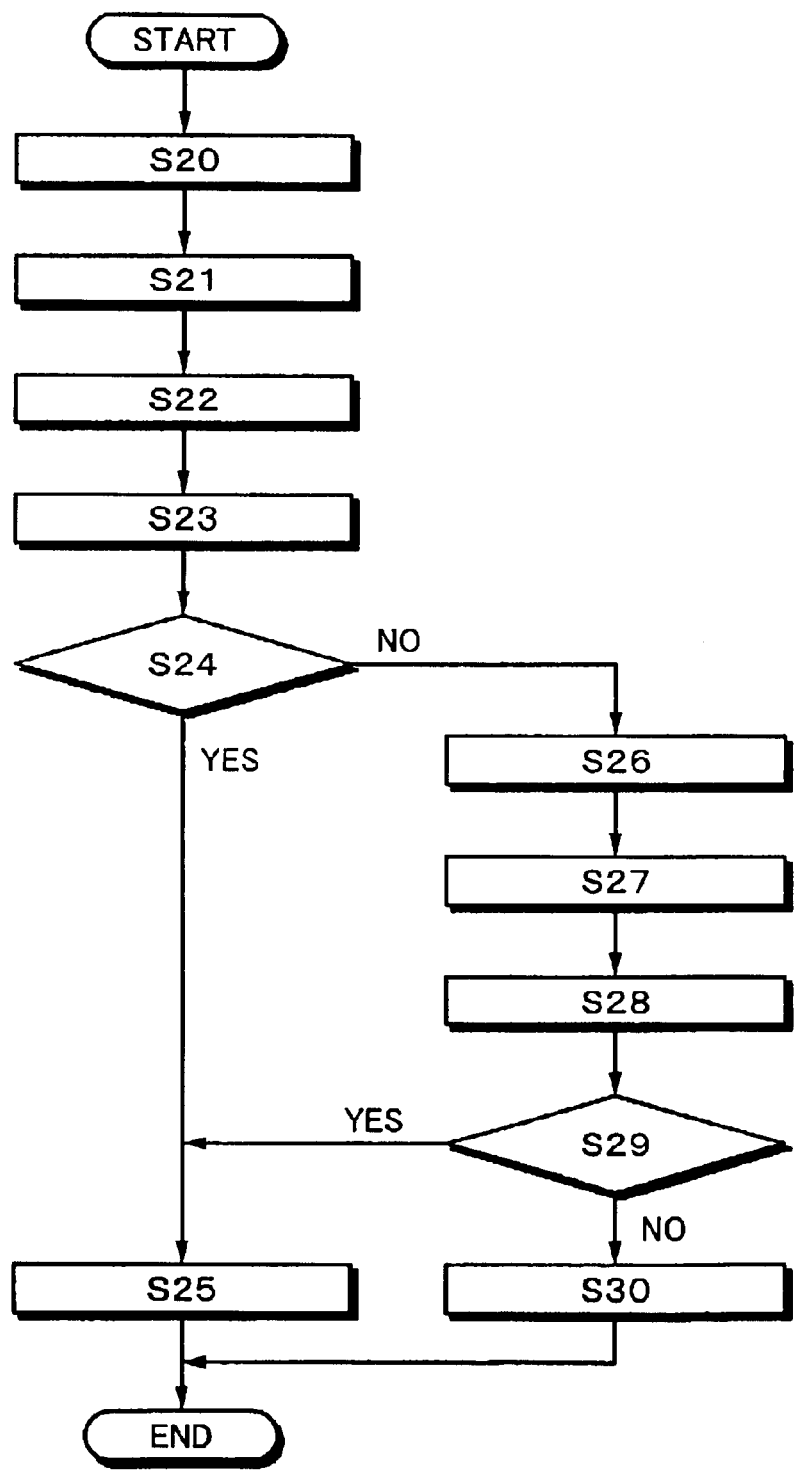
FIG. 6 is a flowchart showing processes of an example according to the embodiment.

FIG. 6 is a flowchart showing processes of an example in a case where a non-finalized disc is once unloaded from the CD-R recorder and, after that, this disc is again loaded in. In a description of FIG. 6, a detailed explanation about the contents which have already been described by using FIG. 5 mentioned above is omitted here.

First, in step S20, the CD-R 100 in which the audio data has already been recorded, one or more tracks have been formed, and the finalizing process is not performed is properly loaded into the audio CD recorder 1. In the loaded CD-R 100, the track numbers TNOs, the start time, and the end time of the recorded tracks have been recorded in the PMA. The peculiar disc ID has been recorded at ADR=2 of the PMA onto the CD-R 100 by the method as shown in the flowchart of FIG. 5 mentioned above.

In step S21, calibration of the laser power for writing is executed by using the PCA of the loaded disc.

In step S22, the disc ID recorded in the PMA on the CD-R 100 is read out and the track numbers TNOs, the start time, and the end time regarding the recorded tracks are read out. In next step S23, the disc ID read out from the PMA on the CD-R 100 in step S22 is compared with the disc ID stored in the non-volatile memory 121 by the microcontroller 120. Thus, if the disc ID which coincides with the disc ID read out from the PMA has been stored in the non-volatile memory 121, the text data corresponding to such a disc ID is read out from the non-volatile memory 121.

The text data read out from the non-volatile memory 121 is supplied to the microcontroller 120. In the microcontroller 120, a display control signal is formed on the basis of the supplied text data and the formed display control signal is supplied to the display unit 122. The display unit 122 displays the text data on the basis of the supplied display control signal.

For example, if the text data and the track number TNO have been inputted in correspondence to each other, the text data is displayed by the display unit 122 so that the correspondence relation can be understood. When the text data is inputted, if other information such as an album title or the like has also been inputted, such data is also properly displayed by the display unit 122.

In step S24, whether the finalizing process is executed or not is discriminated. If it is determined that the finalizing process is executed, the processing routine advances to step S25. In step S25, the disc ID of the CD-R 100 which has been loaded at present is compared with the disc ID stored in the non-volatile memory 121 by the microcontroller 120. The text data corresponding to the disc ID which coincides with the disc ID of the CD-R 100 which has been loaded at present among the disc IDs stored in the non-volatile memory 121 is read out, encoded into the subcode, and written as TOC information into the lead-in area on the CD-R 100.

The text data read out from the non-volatile memory 121 is written as TOC information onto the CD-R 100 and, thereafter, erased from the non-volatile memory 121. The invention is not limited to this example. It is also possible to hold the text data into the non-volatile memory 121 for a period of time of a certain extent and, thereafter, erase it. The erasure of the text data from the nonvolatile memory 121 can be also performed on the basis of an instruction of the user.

If it is determined in step S24 that the finalizing process is not executed, the processing routine advances to step S26 and the audio data is recorded into the PGA. In this step, new audio data is written onto the track which has already been recorded and a track is added. In step S27, for example, music piece name information showing the audio data recorded in step S26 is inputted as text data by the input unit 123 in next step S28. The inputted text data is stored into the non-volatile memory 121 so as to be associated with the disc ID showing the CD-R 100 which has been loaded at present.

In step S29, whether the finalizing process is executed or not is discriminated. If it is decided that the finalizing process is executed, the processing routine advances to step S24. The text data stored in the nonvolatile memory 121 is read out and written as TOC information into the lead-in area on the CD-R 100 and, at the same time, for example, this text data is erased from the non-volatile memory 121.

If it is determined in step S29 that the finalizing process is not executed, the processing routine advances to step S30. In step S30, the track number TNO of ADR=1 and the start time and end time of the newly recorded track are written into the PMA.

In the flowchart of FIG. 6, the processes in steps S27 and S28 can be executed before the process in step S26 is finished. The order of the process in step S26 and the order of the processes in steps S27 and S28 can be also made to be different from those shown in FIG. 6. That is, the audio signal can be also recorded after the text data was inputted. Further, all text information regarding the audio signal which will be recorded onto the CD-R 100 can be also preliminarily inputted.

Figure 7:
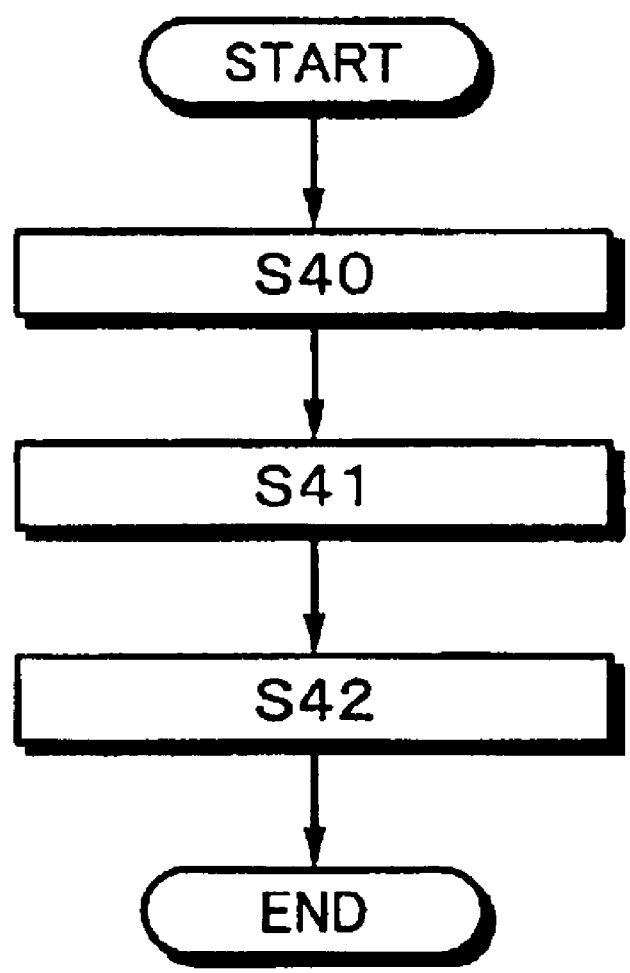
FIG. 7 is a flowchart showing processes of an example according to the embodiment.

FIG. 7 is a flowchart showing processes of an example in a case where the CD-R 100 in which the finalizing process is not executed has been unloaded from the CD-R recorder 1. In step S40, the CD-R 100 in which the finalizing process is not executed is loaded out from the audio CD recorder 1 and ejected. On this CD-R 100, the disc ID has already been written into the PMA and the audio signal has been recorded by the audio CD recorder 1. The text data corresponding to the audio signal recorded on this CD-R 100 has already been inputted and stored in the non-volatile memory 121.

In step S41, a desired disc ID is inputted by the user from the input unit 123 to the audio CD recorder 1. The inputted disc ID is supplied to the microcontroller 120. In next step S42, the inputted disc ID is compared with the disc ID stored in the non-volatile memory 121 by the microcontroller 120. The text data corresponding to the disc ID which coincides with the inputted disc ID is read out from the non-volatile memory 121. The read-out text data is supplied to the display unit 122 via the microcontroller 120. The text data is displayed by the display unit 122.

According to the processes of the flowchart of FIG. 7, the case where the CD-R 100 is unloaded from the audio CD recorder 1 and ejected and, subsequently, the disc ID is inputted has been described. However, the invention is not limited to such an example. For instance, it is also possible to construct in a manner such that even during the loading of the CD-R 100 in the audio CD recorder 1 or during the recording of the audio signal onto the loaded CD-R 100, by inputting a disc ID different from the disc ID of this CD-R 100, the text data corresponding to the inputted disc ID can be displayed.

Although the case where the text data inputted from the input unit 123 is stored into the non-volatile memory 121 has been described above, the invention is not limited to such an example. For instance, the foregoing temporary TOC information can be stored into the nonvolatile memory 121. By storing the temporary TOC information into the non-volatile memory 121 in association with the disc ID, even if the CD-R 100 corresponding to the temporary TOC information is not loaded into the audio CD recorder 1, for example, the residual recordable time of the CD-R 100 can be known.

That is, by inputting the disc ID of the desired CD-R 100 from the input unit 123 in a state where the CD-R 100 is not loaded into the audio CD recorder 1, the temporary TOC information corresponding to the disc ID is read out from the non-volatile memory 121. By obtaining the time of the audio signal which has already been recorded in the corresponding CD-R 100 on the basis of the read-out temporary TOC information, the residual recordable time can be known. The residual time information is displayed by the display unit 122.

As described above, according to the invention, the disc in which the audio data has been recorded and the "finalize" is not performed and the text data inputted with respect to the audio data recorded on the disc have been stored in the memory so as to be associated with each other by the disc ID. Therefore, the text data can be also inputted at timing other than "finalize".

Since the inputted text data has been stored in correspondence to the disc ID, there is an effect such that even when the unloaded disc in which "finalize" is not performed is again loaded, the text data which was inputted before can be displayed and the text data can be newly additionally inputted.

Further, upon "finalize", the text data which was inputted before and the text data which has newly been inputted after the disc was again loaded can be recorded together as TOC information onto the disc.

Moreover, even when the disc is unloaded and the disc does not exist in the apparatus, the text data inputted to the unloaded disc can be displayed.

What is claimed is:

1. A recording and reproducing apparatus for recording and reproducing data onto/from a recording medium having a recording area where a program can be recorded and a management area where management information for managing the program recorded in the recording area is recorded, comprising:

recording means for recording an identifier that is peculiar to the recording medium into said management area and the program into said recording area upon recording;

memory means for holding the identifier peculiar to said recording medium and information regarding the program which is recorded into said recording area in correspondence to each other;

reproducing means for reproducing an identifier of said management area on the recording medium inserted after said recording medium was once ejected before the management information in said management area is updated;

comparing means for comparing the identifier reproduced by said reproducing means with the identifier held in said memory means;

control means for controlling said recording means so that the information regarding the program which is recorded into said memory means in correspondence to the identifier peculiar to said recording medium is recorded as said management information when it is decided by said comparing means that the identifier reproduced by said reproducing means and the identifier held in said memory means coincide; and display means for, when it is decided by said comparing means that the identifier reproduced by said reproducing means and the identifier held in said memory means coincide, displaying the information regarding the program which is recorded into said memory means in correspondence to the identifier peculiar to said recording medium.

2. A recording and reproducing apparatus for recording and reproducing data onto/from a recording medium having a recording area where a program can be recorded and a management area where management information for managing the program recorded in the recording area is recorded, comprising:

recording means for recording an identifier that is peculiar to the recording medium into said management area and the program into said recording area upon recording;

memory means for holding the identifier peculiar to said recording medium and information regarding the program which is recorded into said recording area in correspondence to each other;

reproducing means for reproducing an identifier of said management area on the recording medium inserted after said recording medium was once ejected before the management information in said management area is updated;

comparing means for comparing the identifier reproduced by said reproducing means with the identifier held in said memory means; and control means for controlling said recording means so that the information regarding the program which is recorded into said memory means in correspondence to the identifier peculiar to said recording medium is recorded as said management information when it is decided by said comparing means that the identifier reproduced by said reproducing means and the identifier held in said memory means coincide;

wherein irrespective of the presence or absence of said recording medium, the information regarding said program held in said memory means is sequentially displayed in accordance with an operation to operating means.

* * * * *